United States Patent
Yang et al.

(10) Patent No.: US 9,285,954 B2
(45) Date of Patent: Mar. 15, 2016

(54) DYNAMICALLY-GENERATED SELECTABLE OPTION ICONS

(71) Applicant: Google Inc., Mountain View, CA (US)

(72) Inventors: Fan Yang, Beijing (CN); Feng Yuan, Beijing (CN)

(73) Assignee: Google Inc., Mountain View, CA (US)

( * ) Notice: Subject to any disclaimer, the term of this patent is extended or adjusted under 35 U.S.C. 154(b) by 220 days.

(21) Appl. No.: 13/778,760

(22) Filed: Feb. 27, 2013

(65) Prior Publication Data

US 2015/0160792 A1 Jun. 11, 2015

Related U.S. Application Data

(60) Provisional application No. 61/604,975, filed on Feb. 29, 2012.

(51) Int. Cl.
*G06F 3/048* (2013.01)
*G06F 3/0482* (2013.01)

(52) U.S. Cl.
CPC .................................... *G06F 3/0482* (2013.01)

(58) Field of Classification Search
CPC .. G06F 3/0482; G06F 3/04842; G06F 3/0489
USPC .................................................. 715/812, 816
See application file for complete search history.

(56) References Cited

U.S. PATENT DOCUMENTS

| | | | |
|---|---|---|---|
| 7,797,644 B1 * | 9/2010 | Bhojan | G06F 3/0489 715/816 |
| 2006/0242109 A1 * | 10/2006 | Pereira et al. | 707/1 |
| 2007/0061753 A1 * | 3/2007 | Ng et al. | 715/816 |
| 2009/0010405 A1 * | 1/2009 | Toebes | 379/93.23 |
| 2009/0043741 A1 * | 2/2009 | Kim | 707/3 |
| 2012/0296627 A1 * | 11/2012 | Suzuki et al. | 704/2 |
| 2012/0297294 A1 * | 11/2012 | Scott et al. | 715/261 |
| 2015/0058776 A1 * | 2/2015 | Liu et al. | 715/771 |

* cited by examiner

*Primary Examiner* — Omar Abdul-Ali
(74) *Attorney, Agent, or Firm* — Remarck Law Group PLC

(57) ABSTRACT

Systems and techniques are provided for dynamically generating a list of selectable options based on one or more applicable factors, which include visual representations of input components that can be used to select from among the options. For example, an icon corresponding to an input component may be displayed proximate to a respective selectable option such that activating the input component elects the selectable option. Additionally, each icon may be visually similar to its respective input component.

24 Claims, 7 Drawing Sheets

DYNAMICALLY-GENERATED SELECTABLE OPTION ICONS

BACKGROUND

Computer programs such as websites, software programs, applications, video games and the like often provide multiple options from which a user may select. Selection of an option may result in a subsequent event such as committing the selected option as a variable for the computer program. As an example, a video game may contain a menu with multiple characters from which the user may select. The user may scroll to a desired character by using directional buttons on a game pad and may select the character by pressing a selection button on the game pad. Scrolling to the desired character using the directional buttons may highlight the character and selecting the character by pressing a selection button may associate the character with the user and the computer program may step the interface forward while maintaining the association between the user and the selected character.

BRIEF SUMMARY

According to implementations of the disclosed subject matter, a plurality of selectable options may be generated corresponding to, for example, a language selected by a user, where each of the plurality of options corresponds to a translation or transliteration for a received text input. Subsequent to generating the plurality of selectable options, a first input component on an input device may be assigned to a first selectable option and a second input component on the input device may be assigned to a second selectable option. A list containing two or more of the selectable options may be displayed and may contain the first selectable option and an image corresponding to the first input component proximate to the first selectable option. The list may be arranged as a vertical stack or a horizontal line. The plurality of selectable options may be dynamically updated based on a user input as the user input is received from the user. The input device may be a keyboard or a numerical pad and may be touch sensitive. The step of generating a plurality of selectable options may be performed by a service remote from the user to whom the selectable options are presented.

Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims. Systems and techniques according to the present disclosure may allow for dynamically generating a list containing a plurality of selectable options that includes corresponding icons that represent corresponding input components, such as a key on a keyboard. Activating the input component, such as the key on the keyboard, may result in a selection of the respective selectable icon. Such an implementation may allow a user presented with the list of selectable options to easily identify the input component that the user may activate to select a respective option.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Users provided with multiple options may be able to select from among the options by providing an input using an input device. The selectable options may be generated dynamically such that the options presented vary based on a factor such as, but not limited to, a user input, an interface screen, one or more attributes of a program, or any other suitable condition within the application that provides the options. For example, a user may input text into word processing software and multiple selectable thesaurus options may be generated based on the received user input. As a specific example a user may input the word "travel", and the word processor software may dynamically generate; "circulate", "cruise", "drive", and "expedition" as potential alternative words that the user may elect to replace travel. According to an implementation as disclosed herein, the selectable options may be generated by a service remote from a user to whom the selectable options are presented. For example, the user may input a word into a translation service website. Selectable options corresponding to translations for the input word may be generated at a remote translation server in communication with the translation service website. Additionally, a user may select one of the options by activating a button on an input device such as a keyboard, a numerical pad, a game controller, a touch screen, a mobile device, a mobile phone, a tablet, a proprietary device, a wireless device or the like. The button may be a physical hard button or a soft button operable using respective software. An icon may be generated and placed near each respective selectable option such that the icon corresponds to the button on the input device that can be pressed to select the option. The icon may be placed in any appropriate position corresponding to the respective selectable option such as, but not limited to, the right of, left of, above, below, diagonal to, proximally close to, or the like. Continuing the previous example, a user may select the selectable thesaurus option "drive" by activating the button 3 on a numerical pad. Accordingly, an icon representing the physical "3" key on the numerical pad may be provided directly to the left of the selectable thesaurus option "drive". Activating the "3" key on the numerical pad may result in a selection of the word "drive" and the original word "travel" may be replaced by the word drive.

Figure 3:
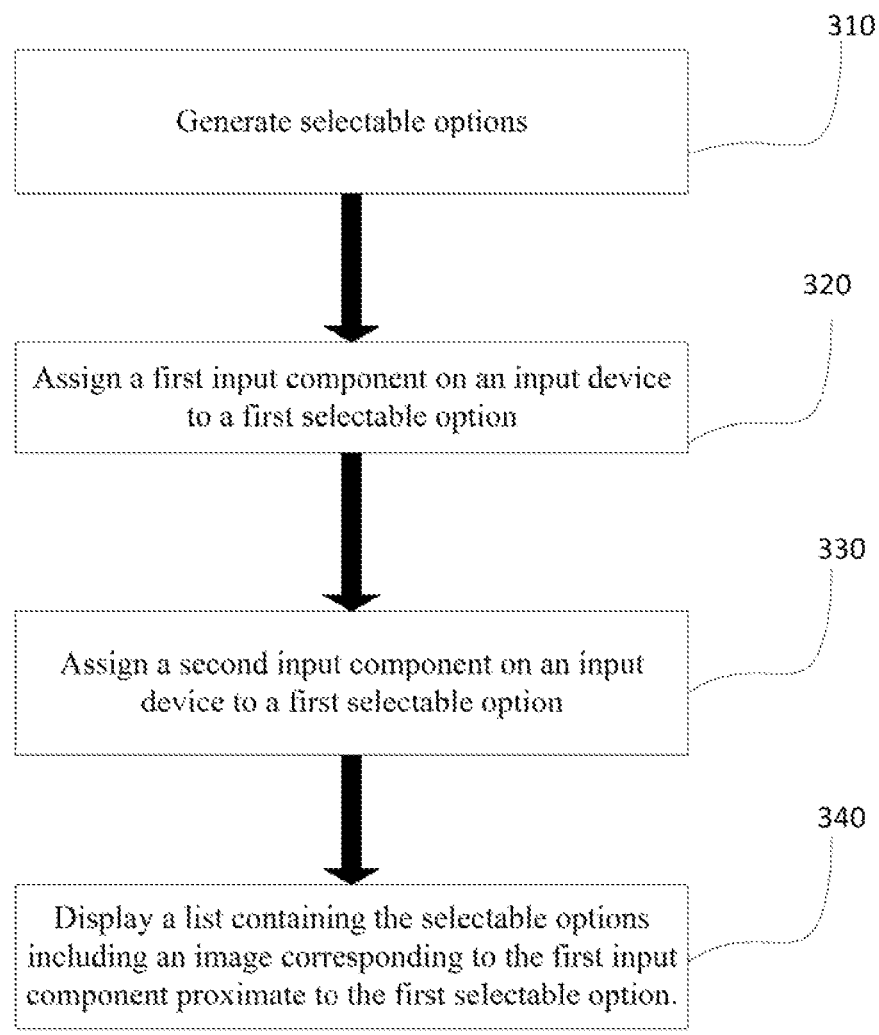
FIG. 3 shows an example process for displaying a list with graphic icons, according to an implementation of the disclosed subject matter.

According to an implementation of the disclosed subject matter, as shown in FIG. 3, multiple selectable options may be generated at step 310. The multiple options may be any applicable set of options such as, but not limited to, words, terms, sentences, images, characteristics, attributes, configurations, media items, search results, consumer goods, or the like. For example, a list of basketball sneakers may be generated for the user to select. The selectable options may be generated based on any applicable factor such as, but not limited to, a user input, an interface screen, one or more attributes of a program, or any other suitable condition within the application that provides the options. For example, a user may input "basketball shoes" into a search bar for a specialized shoe website. The website may dynamically generate a listing of a set of shoes that the user may purchase based on the user input. The list of shoes may be presented to the user in a format that the user views two or more options at the same time, i.e., as a plurality of selectable options. Notably, the selectable options are generated as a response to the user input of "basketball shoes", and thus the specific options provided may vary if a different input such as "baseball shoes" was input into the search bar. Accordingly, a plurality of selectable user options may vary based on one or more factors such that the plurality of selectable options is not predetermined.

Figure 6A:
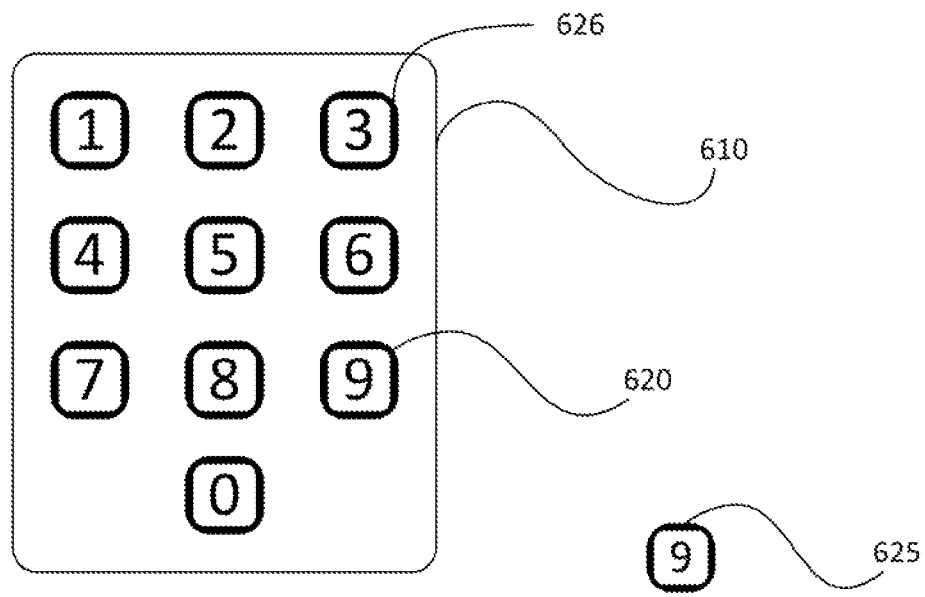
FIG. 6a shows an example visualization corresponding to a numerical pad, according to an implementation of the disclosed subject matter.
Figure 6B:
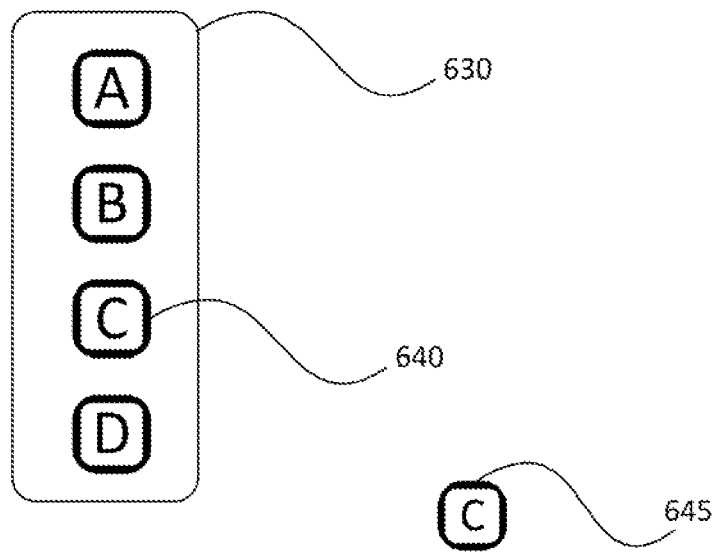
FIG. 6b shows an example visualization corresponding to a customized controller, according to an implementation of the disclosed subject matter.

According to an implementation of the disclosed subject matter, as shown in FIG. 3, input components may be assigned to two or more selectable options at steps 320 and 330 such that each selectable option is assigned a single input component. The input components may be any applicable components such as, but not limited to, a hard button, a soft button, a touch sensitive button, a heat sensitive button, a switch button, a push button, or the like. For example, as shown in FIG. 6a, a numerical pad 610 may contain ten different selectable buttons 1, 2, 3, 4, 5, 6, 7, 8, 9, and 0. A button on the numerical pad 610 may be selected by applying pressure on the button or, alternatively, if the numerical pad 610 is touch sensitive, then by touching the area corresponding to a button. Similarly, as shown in FIG. 6b, a customized controller 630 may contain four different selectable buttons A, B, C, and D. A button on the numerical pad 610 may be selected by applying pressuring on the button or, alternatively, if the numerical pad 610 is touch sensitive, then by touching the area corresponding to a button. One or more selectable options in software configured for the numerical pad 610 may correspond to the buttons on the numerical pad 610, such as 620 corresponding to the button 9. Similarly, one or more selectable options in software configured for the customized controller 630 may correspond to the buttons on the customized controller 630, such as 640 corresponding to the button C. One or more input components may be assigned to one or more selectable options such that activating an input component on an input device corresponds to the selection of the selectable option corresponding to the input component. For example, software configured for the numerical pad 610 may dynamically generate a list of selectable options for a user. The list of selectable options may contain ten items and each item may be assigned an input component. Accordingly, if a user presses the 9 button 620, the selectable option assigned the input component corresponding to the 9 button 620 may be selected.

In an implementation, as disclosed herein, the icon may visually resemble the corresponding physical button that the user should press to select the associated option. Continuing the example, the icon corresponding to the "3" key may be configured to closely resemble a physical "3" key on a computer keyboard. In some cases, if the specific input device used by a user is known, the icon may be tailored to represent the specific input device. For example, if the user is using a laptop that is known to have a "chiclet" or "island" style keyboard in which each key is physically separate from the other, and which are relatively shorter than those on a non-island keyboard, the icon may show a key having appropriate features, such as an "island" type shape, a relatively low height, and the like. The type of device being used by the user may be determined, for example, based upon routine information provided when the user accesses the service, information explicitly provided by the user, or the like.

According to an implementation of the disclosed subject matter, as shown in FIG. 3, a list containing two or more selectable options may be displayed to a user at step 340. The list may contain the selectable options as well as icons proximate to corresponding selectable options. An icon may be any applicable designator including, but not limited to, an image, a symbol, a depiction, a representation, a graphic or the like. An icon may be visually similar to an input component that the icon corresponds to. For example, as shown in FIG. 6a, an input device may be a numerical pad 610 containing a 9 button 620. An icon for the button 620 may be the image of the 9 button 625. Similarly, for example, as shown in FIG. 6b, an input device may be a customized controller 630 containing a C button 640. An icon for the button 640 may be the image of the C button 645. Additionally, an icon may be raised, embossed, shaded, or arranged in any applicable manner such that the icon is visually similar to a corresponding input component. An icon may be placed in any appropriate position corresponding to the respective selectable option such as, but not limited to, the right of, left of, above, below, diagonal to, proximally close to, or the like. As disclosed herein, the list may be generated dynamically based on one or more factors. The list may be displayed proximate to a user input such that the user input and the list are visually associated. For example, a user may input a word into a word processor and the word processor may generate a list of selectable options based on the word. The list may be displayed to the user directly underneath the user input word such that it is visually apparent to the user that the list is associated with the word. The list may contain entries in addition to entries initially displayed to a user. The additional entries may be accessed by a user in any appropriate manner such as, but not limited to, by using a scroll bar, a directional button, a gesture, a scroll wheel, a device orientation, or the like. For example, a dynamically generated list may include seven selectable options, five of which may be displayed to a user at a given time. The user may access additional options by selecting a directional button, such as a down arrow, by clicking on the directional button using a clickable mouse. Upon receiving the selection of the down arrow, two of the originally displayed options may no longer be displayed and two previously non-displayed options may be displayed to the user.

Icons as disclosed herein may be generated dynamically, for example as they are needed to display in association with a list of selectable items. For example, a basic background image may be combined with text overlays corresponding to the buttons available for activation to select each option. As another example, each icon may be created individually as it is needed, such as from a template image definition that is customized for each input component, or the like. More generally, any method of generating an icon as it is needed for display with a selected option may be used in conjunction with the techniques disclosed herein.

Figure 4A:
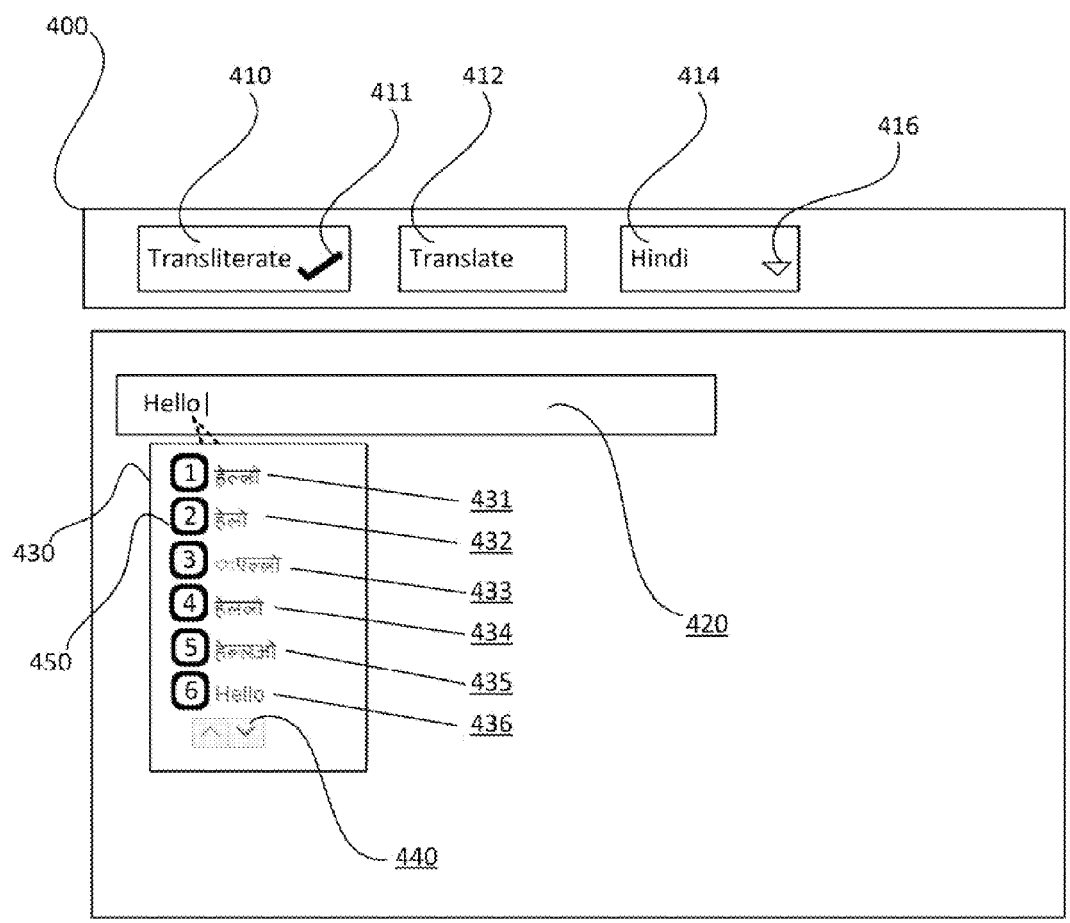
FIG. 4a shows an example visualization corresponding to a displaying a selectable option list with image icons, according to an implementation of the disclosed subject matter.
Figure 5A:
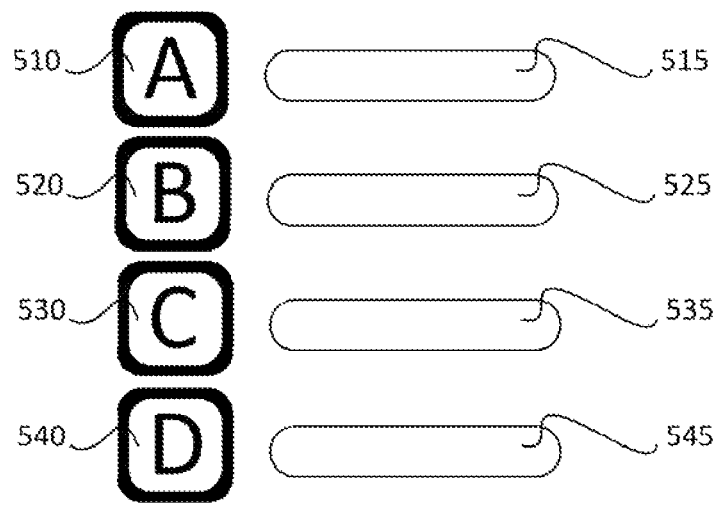
FIG. 5a shows an example visualization corresponding to a vertically stacked selectable option list, according to an implementation of the disclosed subject matter.
Figure 5B:
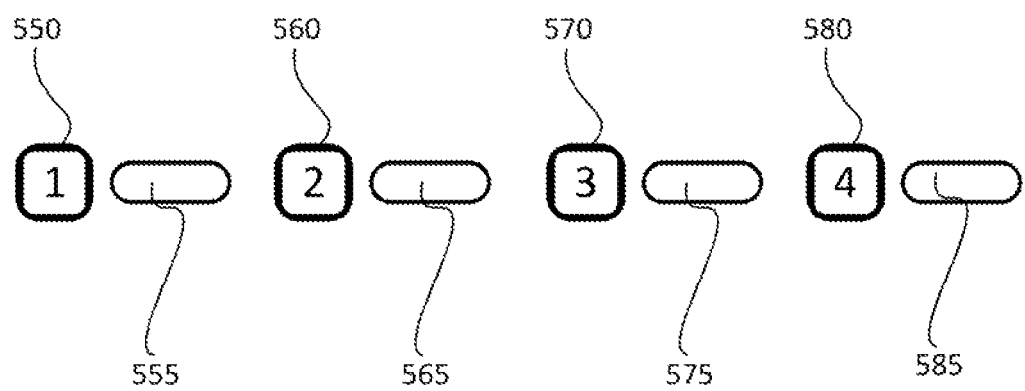
FIG. 5b shows an example visualization corresponding to a horizontally arranged selectable option list, according to an implementation of the disclosed subject matter.

According to an illustrative example of the disclosed subject matter, as shown in FIG. 4a, an online resource 400 may be accessed via a web browser. The online resource may provide a transliteration service by a user selection of the transliterate button 410 or a translation service by a user selection of the translation button 412. A current user selection may be identified by a check mark 411 within the currently selected service. A language box 414 may display a currently selected language and an expansion button 416 may be selected to view a list of other selectable languages. The list may be a vertical list that is populated upon selection of the expansion button 416 and the language selected from the populated list may be displayed in the language box 414. A user may input a phrase for transliteration or translation into the input bar 420. The selected language may be the source or target language corresponding to the transliteration, translation, or any other applicable language based function. As shown in FIG. 4a, a user may input the phrase "Hello" into the input bar 420. A list of selectable options 430 may be dynamically generated based on the user input "Hello". Six options 431, 432, 433, 434, 435, and 436 may be displayed on the web page within the list 430. The web page may be configured for the numerical pad 610 in FIG. 6a and, thus, keys on the numerical pad 610 may be assigned to selectable options such that key 1 is assigned to selectable option 431, key 2 is assigned to selectable option 432, key 3 is assigned to selectable option 433, key 4 is assigned to selectable option 434, key 5 is assigned to selectable option 435, and key 6 is assigned to selectable option 436. Icons corresponding to keys 1 through 6 may be placed adjacent to respective selectable options 431-436 as shown in FIG. 4a. Notably, icons corresponding to physical keys on numerical pad 610 may be placed adjacent to respective selectable options such that a user may easily identify an input key to select for a selectable option. Additional selectable options may be viewed by selecting arrow 440. The selection of arrow 440 may result in displaying a different set of selectable options such that one or more previously visible selectable options may no longer be visible and one or more previously not visible options may be visible. According to an illustrative example, FIG. 5a shows a vertically stacked list containing selectable options 515, 525, 535, and 545 adjacent to icons 510, 520, 530, and 540 respectively. The icons correspond to the customized controller 630 in FIG. 6b such that, for example, pressing the button C 640 on the customized controller 630 corresponds to selecting the selectable option 535. Similarly, FIG. 5b shows a horizontally stacked list containing selectable options 555, 565, 575, and 585 adjacent to icons 550, 560, 570 and 580 respectively. The icons correspond to the numerical pad 610 in FIG. 6a such that, for example, pressing the button 3 626 on the numerical pad 610 corresponds to selecting the selectable option 575.

Figure 4B:
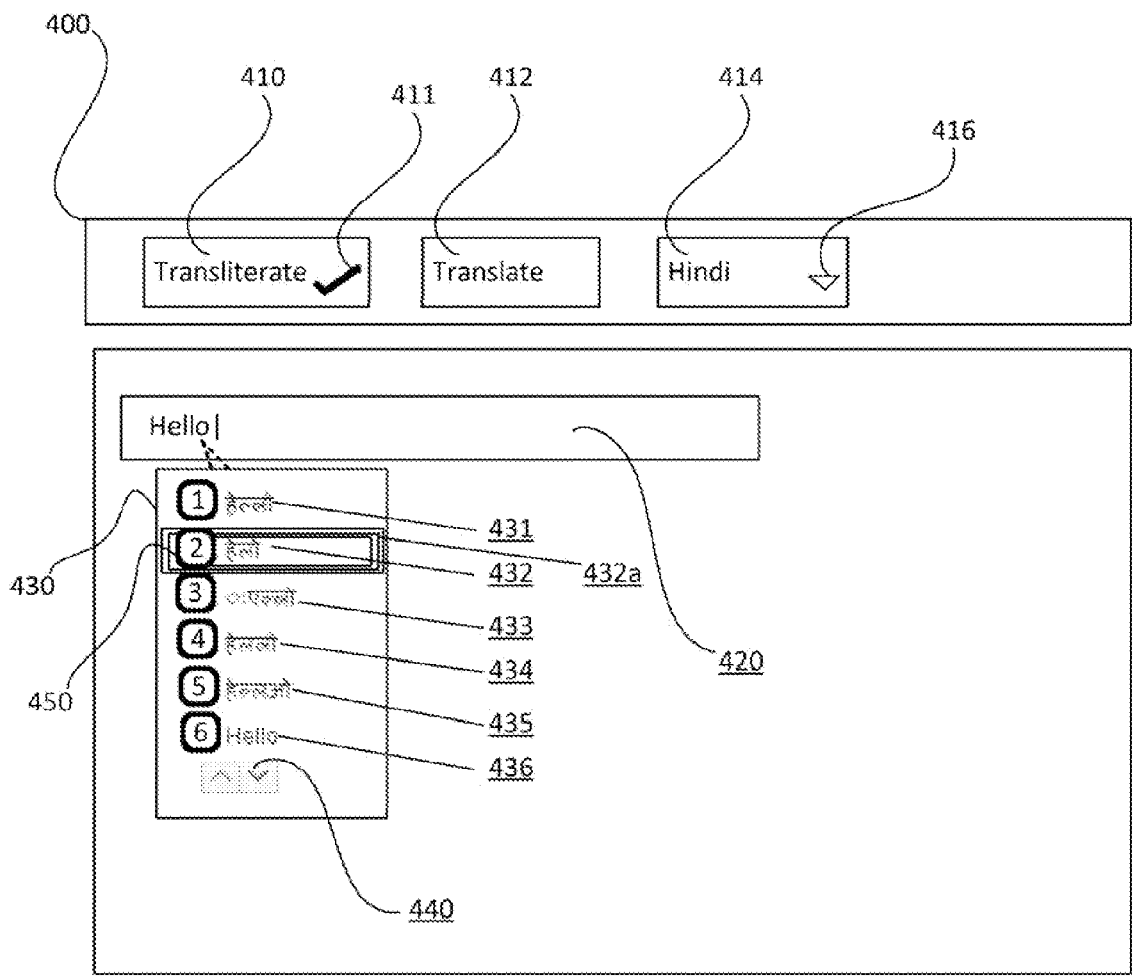
FIG. 4b shows an example visualization corresponding to a displaying a selectable option list with a selected option, according to an implementation of the disclosed subject matter.

According to an illustrative example of the disclosed subject matter, as shown in FIG. 4b, an activation of an input component may visibly differentiate a corresponding selectable option such that the selectable option is visibly different from other selectable options and/or is displayed differently than it was displayed previous to the activation of the corresponding input component. A visible differentiation may be any applicable differentiation such as, but not limited to, a color change, a pointer, shading, an image, an underline, a flashing, a movement, or the like. Notably, a visible differentiation may allow a user to preview which selectable option the user is about to commit. In continuing the previous example, a user may select the 2 key on the numerical pad 610 as shown in FIG. 6a and, accordingly, the second option corresponding to the 2 key may be shaded such that the second option is surrounded by one or more additional boxes. The user may then submit the selection by pressing the 2 key again. Alternatively, the user may then submit the selection by pressing any other commit key, such as an enter key, a space bar, a return key or the like.

Figure 4C:
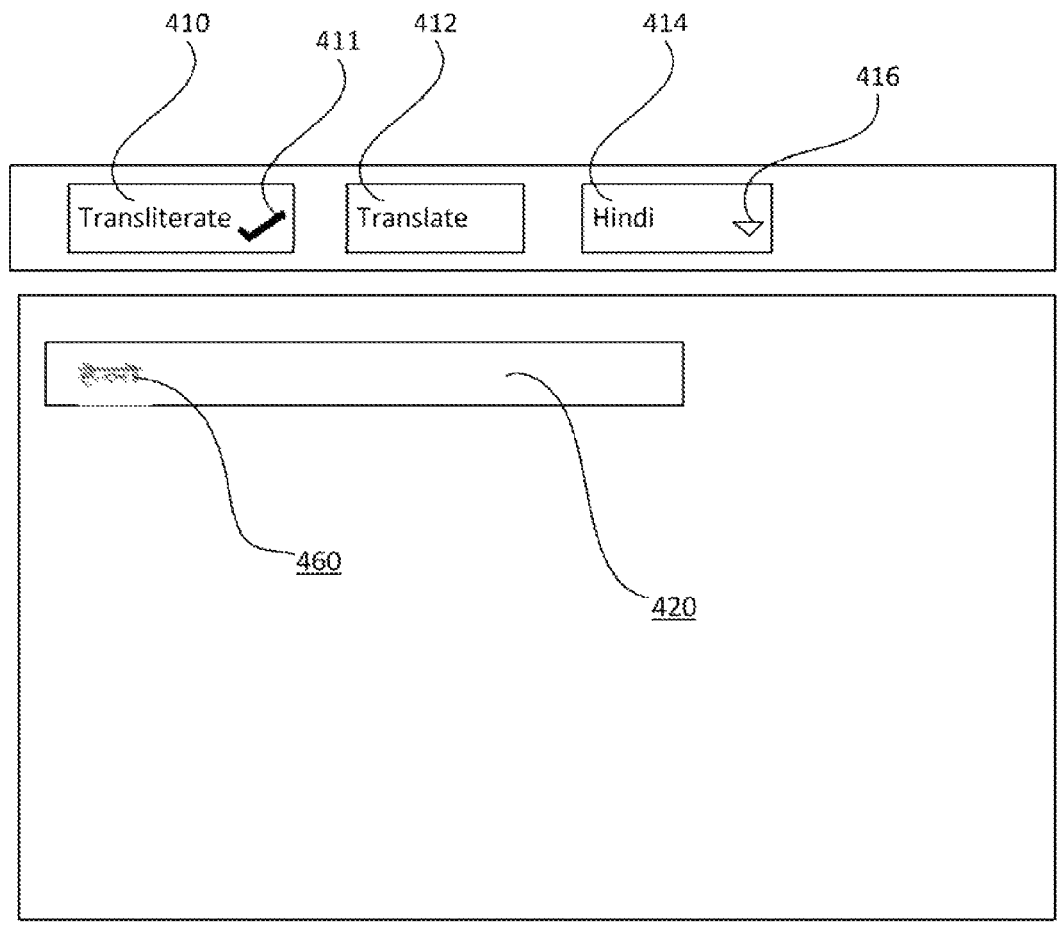
FIG. 4c shows an example visualization corresponding to a displaying a selected option, according to an implementation of the disclosed subject matter.

According to an illustrative example of the disclosed subject matter, as shown in FIG. 4c, a selection of a selectable option may result in electing that option, such as by replacing a user input by the selected option or providing the selected option as a user input. For example, the user input "Hello" in FIG. 4a and FIG. 4b may be replaced by a selected option corresponding to the 2 key. As shown in FIG. 4c, the term "हेलो" 460 may replace the word "Hello" when a user selects the "2" key on the numerical pad. Alternatively, the term "हेलो" 460 may replace the word "Hello" when a user selects the "2" key following by committing the selection by pressing enter. Alternatively or in addition, electing a selectable option may provide the selected option to a virtual "clipboard" similar to that used in word processing software, such that the selected option is available for the user to paste into software that supports the virtual clipboard. Continuing the previous example, a user may press the "2" key and select the term हेलो. The term हेलो may be stored in the user's virtual clipboard such that the user may paste the term directly into a word processing program or any other suitable software that can receive the user input.

Figure 1:
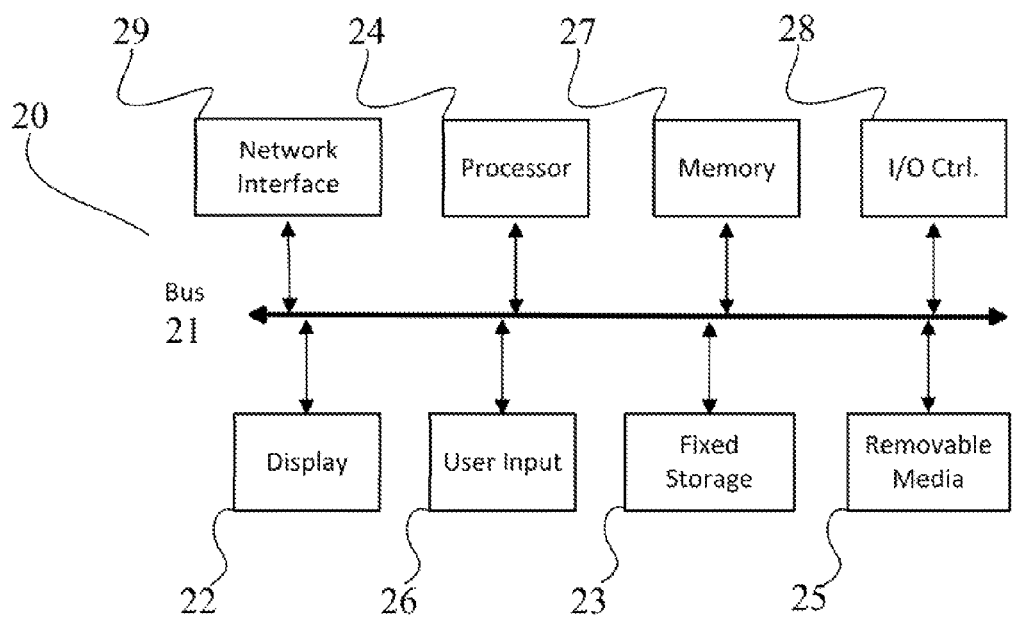
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
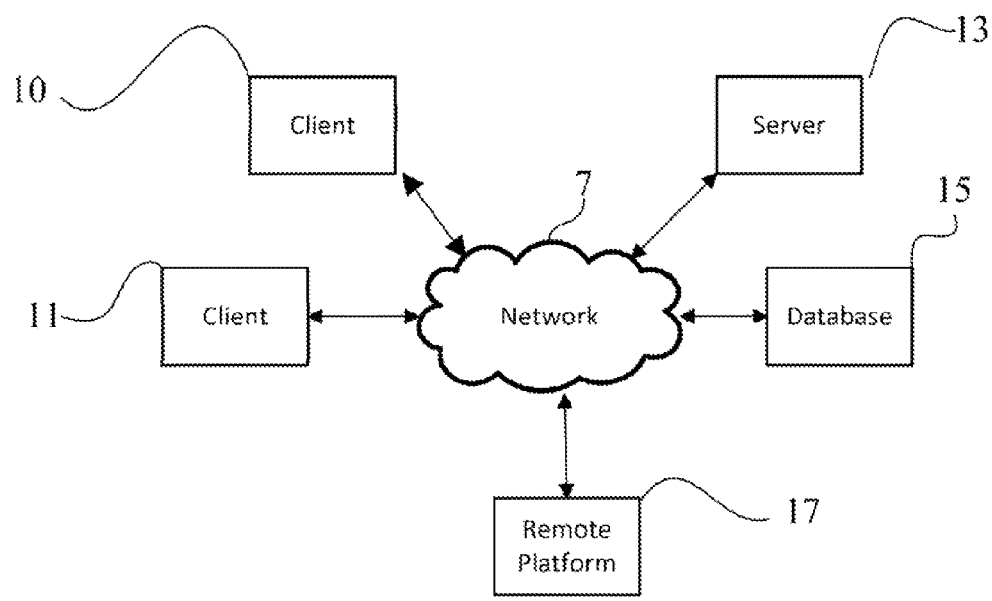
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving, at a computing system via a physical input device associated therewith, a text input to a software application;
in response to receiving the text input, dynamically generating a plurality of selectable options based on the text input and a type of the software application; and
subsequent to dynamically generating the plurality of selectable options:
assigning a first physical input component on the physical input device to a first selectable option;
assigning a second physical input component on the physical input device to a second selectable option; and
displaying a list comprising two or more of the plurality of selectable options, the list comprising:
the first selectable option; and
an image visually resembling the first physical input component proximate to the first selectable option.

2. The method of claim 1, wherein the image corresponding to the first physical input component is not selectable independent of the first selectable option.

3. The method of claim 1, wherein each of the plurality of selectable options is a translation or a transliteration for a received text input.

4. The method of claim 1, wherein the selectable options correspond to a language selected by a user.

5. The method of claim 1, wherein generating the plurality of selectable options is performed by a service remote from a user to whom the selectable options are presented.

6. The method of claim 1, wherein the physical input device is a physical keyboard, and wherein the first and second physical input components are first and second physical keys of the physical keyboard.

7. The method of claim 1, wherein the image is at least one of (i) raised, (ii) embossed, and (iii) shaded.

8. The method of claim 1, wherein the physical input device is one of a touch-sensitive device, a numerical pad, and a wireless controller comprising a plurality of buttons.

9. The method of claim 1, wherein the plurality of selectable options are generated further based on a user interface display associated with the processor.

10. The method of claim 1, wherein the software application is a word processing software application, and wherein at least one of the plurality of selectable options is a thesaurus option for the text input.

11. A system comprising:
a database; and
a processor in connection with the database and associated with a physical input device, the processor configured to:
  receive, via the physical input device, a text input to a software application;
  in response to receiving the text input, dynamically generate a plurality of selectable options based on the text input and a type of the software application; and
  subsequent to dynamically generating the plurality of selectable options:
    assign a first physical input component on the physical input device to a first selectable option;
    assign a second physical input component on the physical input device to a second selectable option; and
    display a list comprising two or more of the plurality of selectable options, the list comprising:
      the first selectable option; and
      an image visually resembling the first physical input component proximate to the first selectable option.

12. The system of claim 11, wherein each of the plurality of selectable options is a translation or a transliteration for a received text input.

13. The system of claim 11, wherein the step of generating a plurality of selectable options is performed by a service remote from a user to whom the selectable options are presented.

14. The system of claim 11, wherein the physical input device is a physical keyboard, and wherein the first and second physical input components are first and second physical keys of the physical keyboard.

15. The system of claim 11, wherein the image is at least one of (i) raised, (ii) embossed, and (iii) shaded.

16. The system of claim 11, wherein the physical input device is one of a touch-sensitive device, a numerical pad, and a wireless controller comprising a plurality of buttons.

17. The system of claim 11, wherein the plurality of selectable options are generated further based on a user interface display of the computing system.

18. The system of claim 11, wherein the software application is a word processing software application, and wherein at least one of the plurality of selectable options is a thesaurus option for the text input.

19. A non-transitory computer readable storage medium storing program instructions, which when executed by a processor associated with a physical input device, cause the processor to:
  receive, via the physical input device, a text input to a software application;
  in response to receiving the text input, dynamically generate a plurality of selectable options based on the text input and a type of the software application; and
  subsequent to dynamically generating the plurality of selectable options:
    assign a first physical input component on the physical input device to a first selectable option;
    assign a second physical input component on the physical input device to a second selectable option; and
    display a list comprising two or more of the plurality of selectable options, the list comprising:
      the first selectable option; and
      an image visually resembling the first physical input component proximate to the first selectable option.

20. The non-transitory computer readable storage medium of claim 19, wherein the physical input device is a physical keyboard, and wherein the first and second physical input components are first and second physical keys of the physical keyboard.

21. The non-transitory computer readable storage medium of claim 19, wherein the image is at least one of (i) raised, (ii) embossed, and (iii) shaded.

22. The non-transitory computer readable storage medium of claim 19, wherein the physical input device is one of a touch-sensitive device, a numerical pad, and a wireless controller comprising a plurality of buttons.

23. The non-transitory computer readable storage medium of claim 19, wherein the plurality of selectable options are generated further based on a user interface display associated with the processor.

24. The non-transitory computer readable storage medium of claim 19, wherein the software application is a word processing software application, and wherein at least one of the plurality of selectable options is a thesaurus option for the text input.

* * * * *